(12) United States Patent
Kobayashi et al.

(10) Patent No.: US 6,578,993 B2
(45) Date of Patent: Jun. 17, 2003

(54) VEHICLE HEADLAMP SYSTEM

(75) Inventors: Shoji Kobayashi, Shizuoka (JP);
Takeshi Masuda, Shizuoka (JP);
Takashi Inoue, Shizuoka (JP);
Kazuhiro Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/924,547

(22) Filed: Aug. 9, 2001

(65) Prior Publication Data

US 2002/0036907 A1 Mar. 28, 2002

(30) Foreign Application Priority Data

Aug. 9, 2000 (JP) ........................................ 2000-240723

(51) Int. Cl.[7] ................................................ B60Q 1/06
(52) U.S. Cl. ..................... 362/466; 362/464; 362/276; 315/79; 315/82
(58) Field of Search ................................ 362/464, 465, 362/466, 467, 276; 340/459, 462; 315/79, 80, 81, 82, 83

(56) References Cited

U.S. PATENT DOCUMENTS

| | | | |
|---|---|---|---|
| 4,768,135 A | 8/1988 | Kretschmer | 362/66 |
| 5,562,336 A | 10/1996 | Gotou | 362/37 |
| 5,588,733 A | 12/1996 | Gotou | 362/37 |
| 6,049,749 A | 4/2000 | Kobayashi | 701/49 |
| 6,343,869 B1 * | 2/2002 | Kobayashi | 315/79 |

* cited by examiner

*Primary Examiner*—Sandra O'Shea
*Assistant Examiner*—John Anthony Ward
(74) *Attorney, Agent, or Firm*—Sughrue Mion, PLLC

(57) ABSTRACT

Beams from headlamps are controlled by a beam control ECU. The beam control ECU has a road-configuration-corresponding mode and a corresponding-turning-angle mode. In the road-configuration-corresponding mode, beam control is performed according to the detected results of a road configuration ahead of a vehicle. In the corresponding-turning-angle mode, beam control is performed according the detected results of the turning angle of the vehicle. One of these modes is selected in response to the vehicle speed. Thus, the beam emitting direction is prevented from being inadvertently changed-irrespective of the rise and fall of vehicle speed-through the actuation of a direction indicator or a steering operation.

11 Claims, 9 Drawing Sheets

ROAD CONFIGURATION CONTROL MODE

INTERSECTION CONTROL MODE

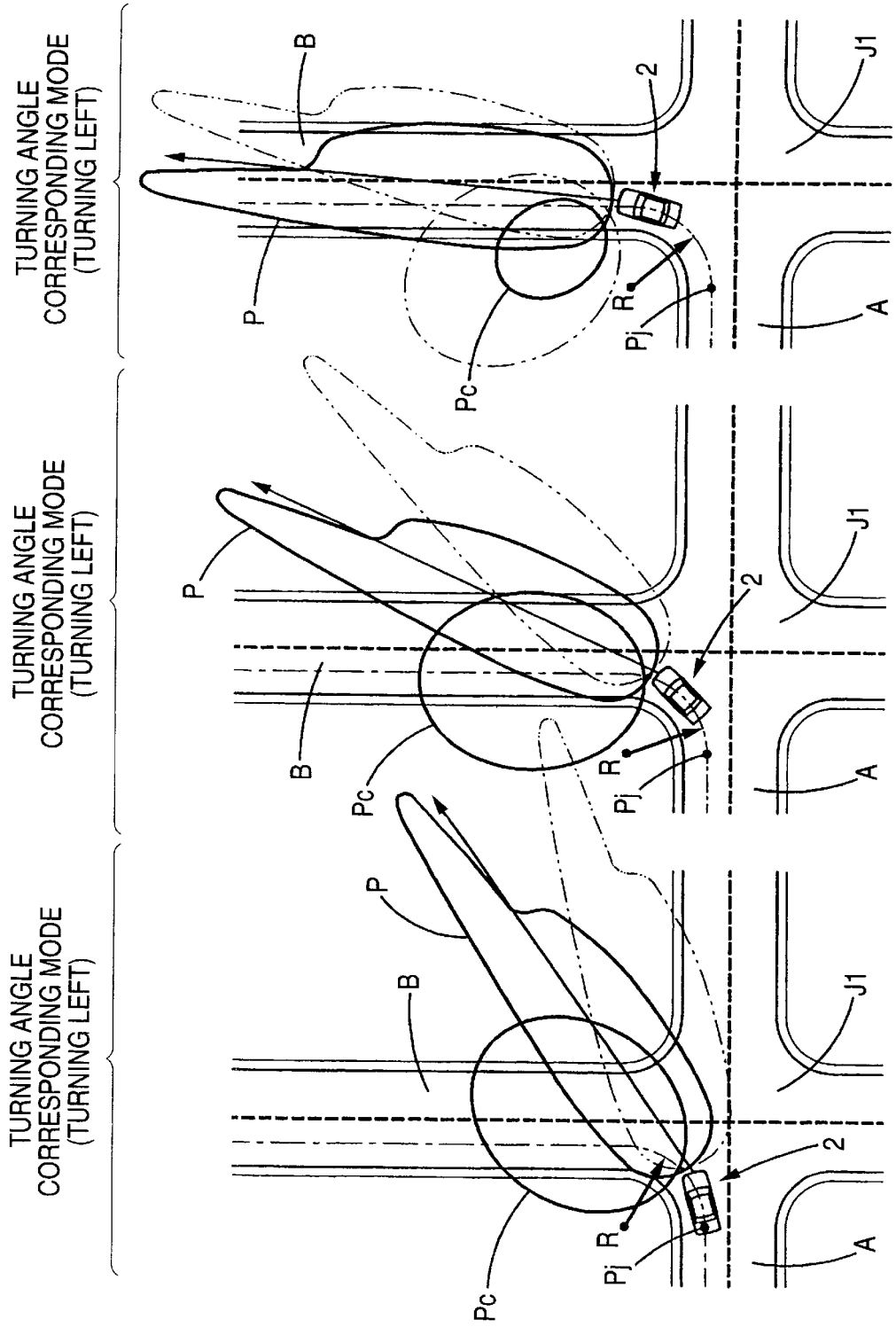

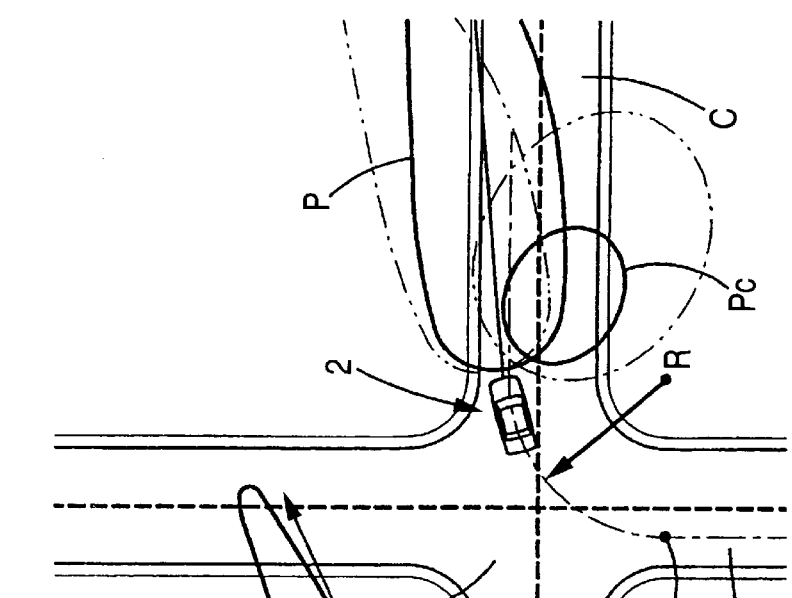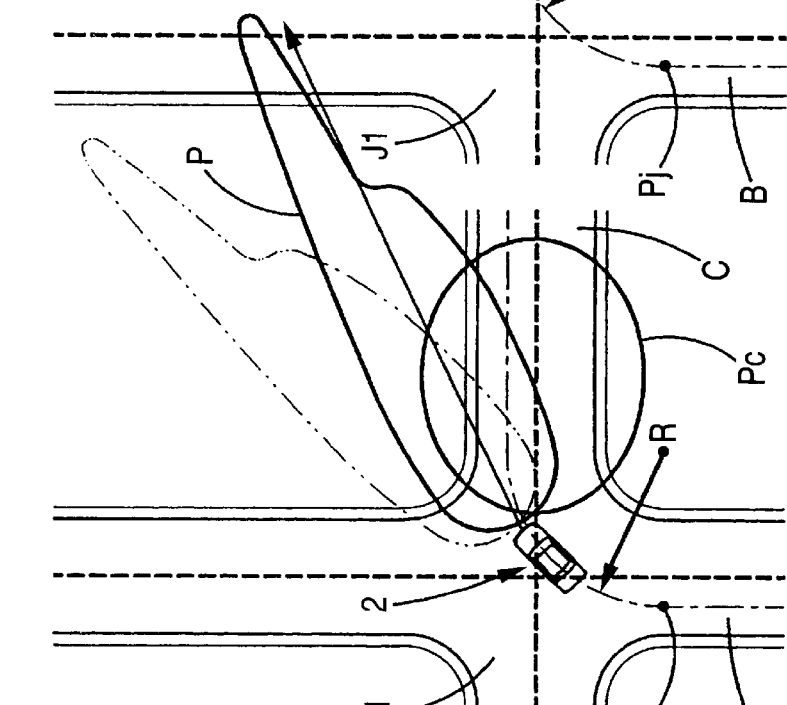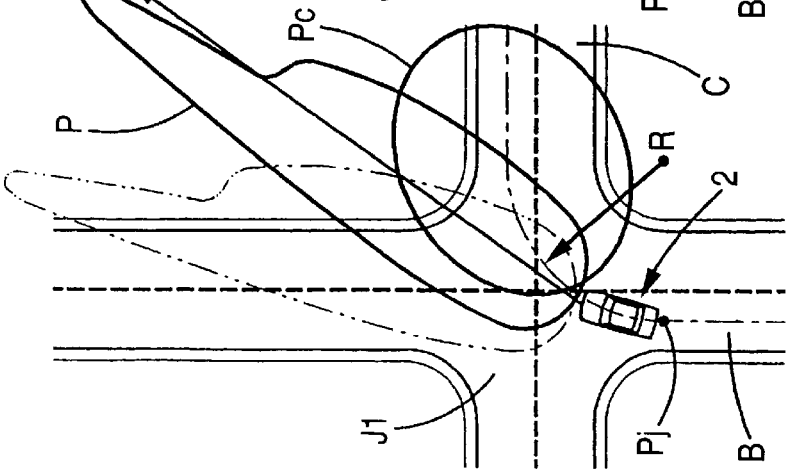

VEHICLE HEADLAMP SYSTEM

BACKGROUND OF THE INVENTION

1. Field of the Invention

The present invention relates to a vehicle headlamp system adapted to control the beams emitted from headlamps.

2. Description of the Related Art

Typical conventional vehicle headlamps are incapable of sufficiently irradiating road surfaces ahead of a vehicle when the vehicle is driven on mountain roads, around curves at intersections, and so forth, because the beam emitting directions are fixed.

In this connection, JP-A-8-192674 discloses a vehicle headlamp system designed to improve visibility when a vehicle is running around a curve at an intersection, and the like, by directing beam emission toward a road surface ahead of the vehicle in a curved travel direction when a direction indicator is actuated or when steering is conducted.

In the vehicle headlamp system in the above-described publication, however, unnecessary beam control may be performed because the beam emitting direction is varied with the actuation of the direction indicator, or with steering, even while the vehicle is running in accordance with the road configuration. Further, even when the direction indicator is actuated to change a lane while the vehicle is running on a straight road at a high speed, for example, the beam emitting direction may be varied. In such a case as this, the problem is that the driver may be given a feeling of wrongness.

SUMMARY OF THE INVENTION

An object of the present invention, made in view of the foregoing circumstances, is to provide a vehicle headlamp system for allowing a road surface ahead of a vehicle to be sufficiently irradiated without giving a driver a feeling of wrongness.

In order to accomplish the above and other objects, there is selected, in response to the vehicle speed, one of the modes in which beam control is performed in accordance with road configuration ahead of a vehicle, and in accordance with the turning angle of the vehicle.

A vehicle headlamp system according to the invention comprises:

headlamps for forwardly emitting beams from a vehicle;

beam control means for controlling the beams emitted from said headlamps;

road configuration detection means for detecting a road configuration ahead of the vehicle; and turning-angle detection means for detecting the turning angle of the vehicle, wherein said beam control means is provided with a road-configuration-corresponding mode in which beam control is performed according to the results detected by said road configuration detection means, and a corresponding-turning-angle mode in which beam control is performed according to the results detected by said turning-angle detection means, and further wherein one of said road-configuration-corresponding mode and said corresponding-turning-angle mode is selected in response to the vehicle speed.

The contents of the beam control—performed by the 'beam control means'—are not limited to specific ones, but may include any suitable contents such as: the direction of the beam emitted from each headlamp; the emission range of the beam emitted therefrom; and the emitted quantity of light, or a proper combination of them.

The 'road configuration detection means' is not limited to specific contents for detection, but may be any suitable means such as a navigation unit and a CCD camera capable of detecting a road configuration ahead of a vehicle.

The 'turning-angle detection means' is not limited to specific contents, but may be any suitable one such as a steering-angle sensor and a yaw-rate sensor capable of detecting the turning angle of a vehicle.

The contents of the 'road-configuration-corresponding mode' and the 'turning angle corresponding mode' in which beams are emitted are not limited to specific embodiments described herein.

As shown in the above-described arrangement, the beam control means for controlling the beams—emitted from the headlamps in the vehicle headlamp system according to the invention—is provided with the road-configuration-corresponding mode ad the corresponding-turning-angle mode. In the road-configuration-corresponding mode, beam control is performed according to the detected results of the road configuration ahead of the vehicle. In the corresponding-turning-angle mode, beam control is performed according to the detected results of the turning angle of the vehicle, detected by the turning-angle detection means. One of the modes is selected in response to the vehicle speed, whereby the beam emitting direction is prevented from being inadvertently changed—irrespective of the rise and fall of vehicle speed—through the actuation of the direction indicator or the steering operation as before.

Therefore, according to the invention, the vehicle headlamp system so configured as to perform beam control over the headlamps provides the road surface ahead of the vehicle with sufficient irradiation without giving a driver a feeling of wrongness.

The following operation/working effect is achievable. One method of selecting between the aforementioned modes is in response to the vehicle speed. For example, the method may include the steps of performing beam control in the road-configuration-corresponding mode when the vehicle speed is at a predetermined set vehicle speed or higher, and performing beam control in the corresponding-turning-angle mode when the actual vehicle speed is lower than the set vehicle speed.

More specifically, to sufficiently irradiate the road surface ahead of the vehicle, it is basically preferred to perform beam control according to the detected results of the road configuration ahead of the vehicle. However, the lane and course are often changed during traveling at a low vehicle speed in a manner having no connection with the road configuration ahead of the vehicle. Therefore, beam emission in conformity with the actual travel situation of the vehicle can be realized by performing beam control according to the detected results of the turning angle of the vehicle during traveling at a low vehicle speed.

The contents of the 'road-configuration-corresponding mode' are not limited to specific described embodiments, as long as beam control is performed according to the detected results of the road configuration ahead of the vehicle. However, if the road-configuration-corresponding mode is constituted of both the road-configuration control mode for carrying out beam emission fit for traveling in accordance with the road configuration, and the intersection-control mode for carrying out beam emission fit for traveling in a curve at an intersection, then smoother beam emission can be carried out and, consequently, the road surface ahead of the vehicle is irradiated still more sufficiently.

When an arriving time or an arriving distance up to the next intersection is of a predetermined value or greater, and when the vehicle speed is a secondary predetermined vehicle speed or higher, it is preferred that beam control is performed in the road-configuration control mode on the assumption that the vehicle will proceed on the traveling road in according with the road configuration for the time being. Thusly, the driver is prevented from being given a feeling of wrongness.

When beam control is performed in the intersection-control mode, if the arriving time to the intersection is less than the predetermined time, and if the direction indicator is in operation, beam emission can be carried out in bilateral turning directions in good time. Consequently, the road surface ahead of the vehicle is irradiated still more sufficiently as compared with a case where beam control is performed in the corresponding-turning-angle mode.

However, when the vehicle speed is not reducible to the marginal turning speed at the next intersection by the time the vehicle 2 reaches that intersection, beam control is preferably performed in the road-configuration control mode, whereby beam control is prevented from being performed in the intersection-control mode, even when the direction indicator is mistakenly actuated or is actuated only to change lanes.

On the other hand, even though the arriving time or the arriving distance to the next intersection is less than the predetermined value, beam control is preferably performed in the road-configuration control mode when the vehicle speed is at the secondary predetermined vehicle speed or higher, and when the direction indicator is unactuated. Thusly, the driver is prevented from being given a feeling of wrongness by uselessly switching the beam control to the intersection-control mode when the vehicle is expected to be running in accordance with the road configuration.

Beam control is preferably performed in the corresponding-turning-angle mode when the steering operation is actually conducted, as when the vehicle travels in a curve at an intersection.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIGS. 5(a) to 5(c) are plan views of roads for use in showing a first specific corresponding-turning-angle mode according to the first embodiment of the invention;

FIGS. 6(a) to 6(c) are plan views of roads for use in showing a second specific corresponding-turning-angle mode according to the first embodiment of the invention;

DETAILED DESCRIPTION OF THE PREFERRED EMBODIMENTS

Embodiments of the present invention will now be described with reference to the drawings.

A first embodiment of the invention will now be described with reference to FIGS. 1–7.

Figure 1:
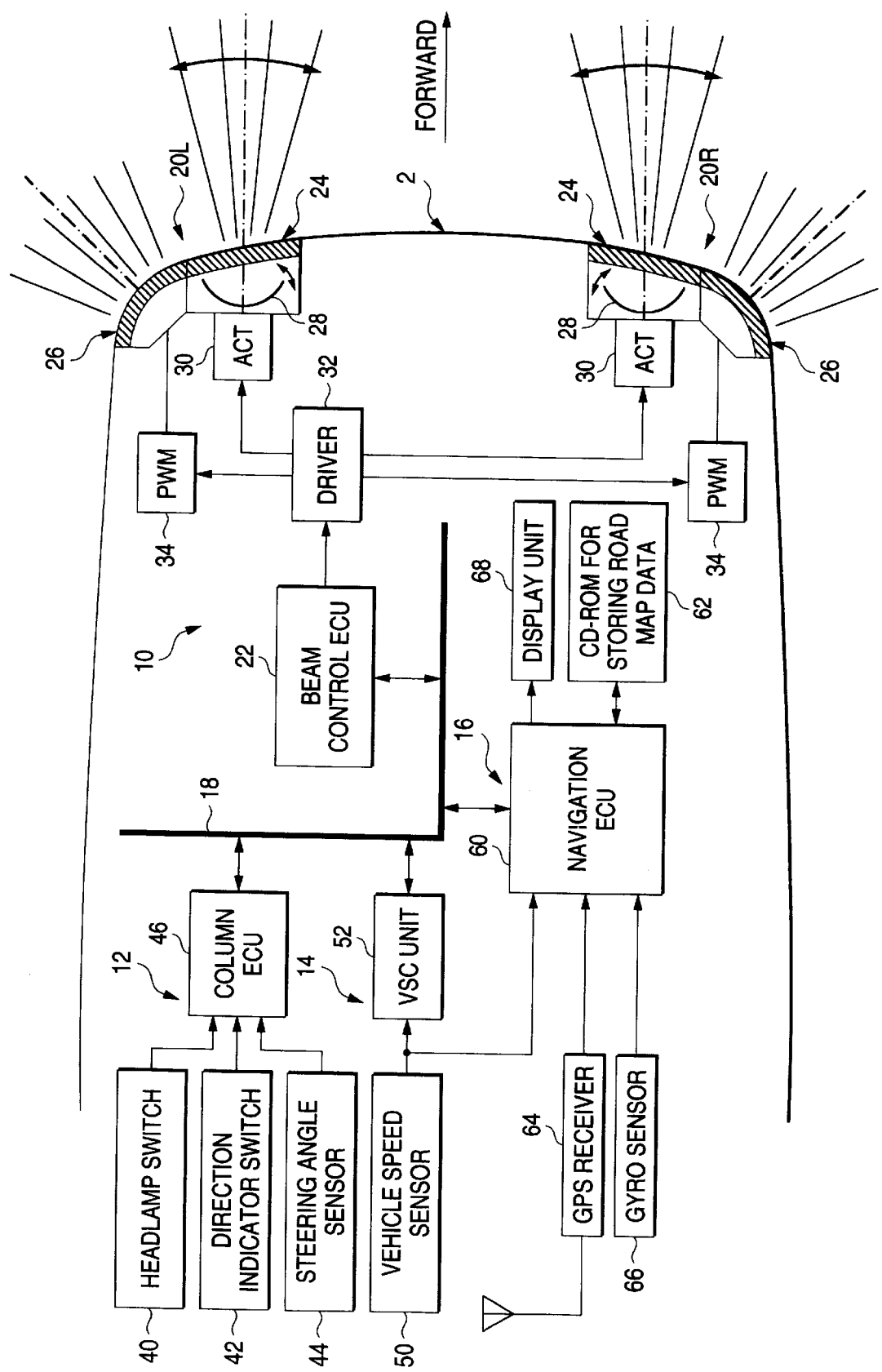
FIG. 1 is an overall block diagram showing a vehicle headlamp system according to a first embodiment of the invention.

FIG. 1 is an overall block diagram showing a vehicle headlamp system according to this embodiment of the invention.

As shown in FIG. 1, the vehicle headlamp system comprises a headlamp unit 10, a column unit 12, a VSC (Vehicle Stability Control) unit 14, and a navigation unit 16 (road configuration detection means), wherein these units are connected together via a interior LAN 18.

The headlamp unit 10 includes a pair of bilateral headlamps 20L and 20R, and a beam control ECU 22 (beam controlling means) for controlling beams from these bilateral headlamps 20L and 20R.

Each of the bilateral headlamps 20L and 20R is formed of a headlamp 24 and a cornering lamp 26. The headlamp 24 is provided in the front end portion of a vehicle 2. The cornering lamp 26 is positioned adjacent to the headlamp 24, and on the exterior in the width direction of the vehicle 2.

Figure 2:
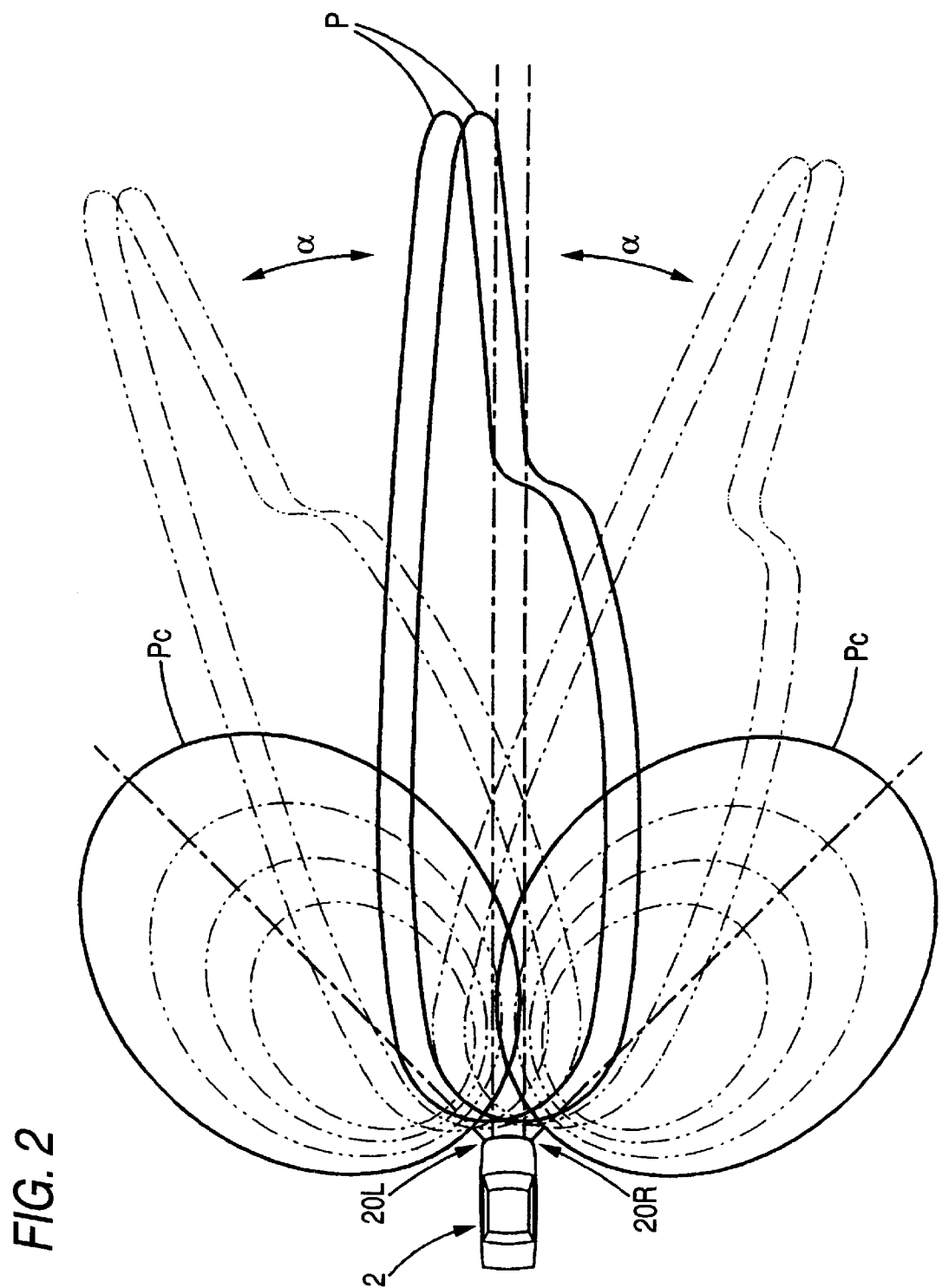
FIG. 2 is a plan view of luminous intensity distributions of the beams emitted from headlamps according to the first embodiment of the invention.

Each headlamp 24 carries out forward, from the vehicle 2, beam emission with a luminous intensity distribution P (low-beam luminous intensity distribution), wherein the beam emission is made by way of the light reflected from a bilaterally-tiltable reflector 28. As shown in FIG. 2, each beam emitting direction can be varied bilaterally up to the position of the luminous intensity distribution P—shown by a chain double-dashed line—that is a predetermined angle $\alpha$ (e.g., $\alpha=20°$) around the head-on direction of the luminous intensity distribution P shown by a solid line, which corresponds to the head-on direction of the vehicle 2. In order to realize the above-described arrangement, each of the bilaterally-tiltable reflectors 28 is tilted when an actuator (ACT) 30 is driven. The actuator 30 is driven under the control of the beam control ECU 22 via a driver 32.

On the other hand, the beam emitting direction of each cornering lamp 26 is fixed at a predetermined angle so as to form a luminous intensity distribution Pc as shown in FIG. 2. For example, the beam emitting direction can be fixed at an angle of 45° from head-on direction of the vehicle. Further, the cornering lamp 26 is connected to the beam control ECU 22 via a dimmer circuit (PWM) 34 and the driver 32, whereby the beam intensity of the cornering lamp 26 can be made variable. More specifically, as shown in FIG. 2, though each luminous intensity distribution Pc becomes large—as shown by the solid line—when the beam intensity is maximized, the luminous intensity distribution Pc gradually becomes smaller in size—as shown by the chain double-dashed lines—when the beam intensity is decreased by dimming.

The column unit 12 is provided in a steering column and includes a headlamp switch 40, a direction indicator switch 42, a steering angle sensor 44 (turning angle detection means), and a column ECU 46. The headlamp switch 40 is used for switching on and off the headlamps 24, and for switching beams (high and low beams). The direction indicator switch 42 is a switch for switching on and off the bilateral direction indicators. The steering angle sensor 44 is used for detecting the steering angle (turning angle) of the vehicle 2, and detects steering angle based on the rotational angle of a steering wheel. Further, the column ECU 46 is used for collecting signals from the headlamp switch 40, the direction indicator switch 42, and the steering angle sensor 44. After collecting signals, the column ECU 46 sends the signals to the interior LAN 18.

The VSC unit 14 includes a vehicle speed sensor 50, a yaw rate sensor (not shown), and a VSC-ECU 52. The VSC-ECU 52 is for avoiding spin and for supporting safety in travel while the vehicle 2 is being driven around a curve, wherein the VSC-ECU receives the signal detected by each the yaw rate sensor and the vehicle speed sensor 50. Alternatively, the signal detected by the steering angle sensor 44 may be used instead of what is detected by the yaw rate sensor.

The navigation unit 16 includes a navigation ECU 60, a CD-ROM 62 for storing road map data, a GPS receiver 64, a gyro sensor (direction sensor) 66, and a display unit 68. The ECU 60—of the navigation unit 16—receives data from each of the sensors incorporated in the navigation unit 16, and receives the vehicle speed data obtained from the vehicle speed sensor 50 of the VSC unit 14. Moreover, the navigation ECU 60 also receives data on the direction indicator switch 42, and data from the steering angle sensor 44, wherein these data are received from the column ECU 46 via the interior LAN. The present position of one's own vehicle, a turning radius, an arrival position a predetermined time later, and the like, are obtained by processing data in the ECU 60 and are then output to the interior LAN 18.

The beam control ECU 22 (of the headlamp unit 10) collects necessary information—via the interior LAN 18—from the column unit 12, the VSC unit 14, and the navigation unit 16, so as to control beams from the bilateral headlamps 20L and 20R in a control mode fit for the travel conditions of the vehicle 2.

The control mode includes a road-configuration-corresponding mode and a corresponding-turning-angle mode. In the road-configuration-corresponding mode, beam control is performed on the basis of forward road configuration data that is obtainable from the navigation unit 16. In the corresponding-turning-angle mode, beam control is performed on the basis of steering angle data (turning angle data) from the steering angle sensor 44.

The road configuration corresponding mode further includes a road configuration control mode in which beam emission fit for traveling in accordance with the road configuration is caused to be carried out and an intersection control mode in which beam emission fit for traveling in a curve at intersections is caused to be carried out.

When the vehicle 2 is driven in accordance with the configuration of a traveling road, in the road-configuration control mode, beam control is performed with a position to be reached by the vehicle 2 a predetermined time later (e.g., 2.5 seconds later) as a target position. The beam control is carried out by tilting the reflectors 28 bilaterally from the head-on direction of the vehicle 2 so as to adequately very the beam emitting direction.

Figure 3:
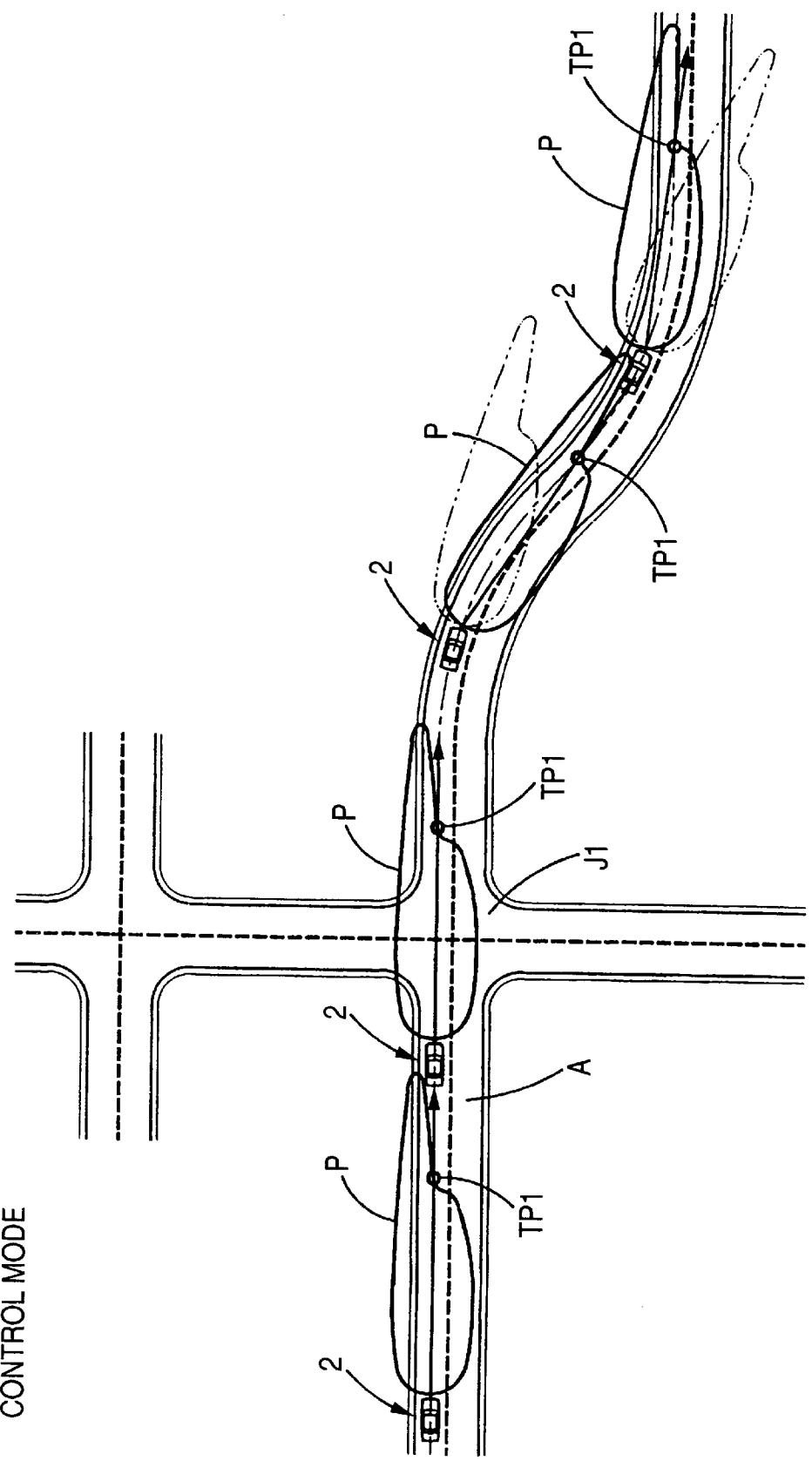
FIG. 3 is a plan view of roads for use in showing a specific road-configuration control mode according to the first embodiment of the invention.

FIG. 3 is a plan view of a road for showing a specific example of the road-configuration control mode.

In this specific example, it is assumed that a vehicle 2, running on a straight traveling road A at 50 km per hour, starts running on an S-shaped curved road after straightly running without turning left or right at the intersection J1.

In FIG. 3, TP1 ahead of the vehicle 2 designates a position (i.e., a target position under the beam control) to be reached by the vehicle 2 after 2.5 seconds. Although a luminous intensity distribution P is also directed ahead of the vehicle 2 because the target position TP1 exists directly ahead of the vehicle 2 on the straight road, the luminous intensity distribution P is deviated to the left or right from the head-on direction of the vehicle 2 on the curved road, so that the luminous intensity distribution P is also deviated bilaterally from the head-on direction thereof as shown by a chain double-dashed line. The luminous intensity distribution P is a synthetic luminous intensity distribution resulting from the pair of bilateral headlamps 24.

On the other hand, in the intersection-control mode, when the vehicle 2 is clearly turned at an intersection ahead, visibility in the travel direction of the vehicle 2 is enhanced by directing beam emission toward the turning direction before the vehicle 2 arrives at the intersection.

Beam control, in this intersection-control mode, is performed with a position to be reached by the vehicle 2 a predetermined time later (e.g., 2.5 seconds later) as a target position. When it is judged that the vehicle 2 will be turned at an intersection, beam control is performed at a point of time when the vehicle 2 approaches within a certain distance of the intersection. The beam control is basically performed by bilaterally tilting the reflectors 28 from the head-on direction of the vehicle 2 in order to direct beam emission toward the turning direction. When the beam emission directed toward the target position cannot be satisfactorily carried out only by tilting the head lamps 24, however, the cornering lamp 26—positioned on the turning side of the vehicle 2—is lighted. At this time, the beam intensity of the cornering lamp 26 is gradually increased as the difference between the maximum tilting angle α of the reflector 28 and the angle directed to the target position increases.

Figure 4:
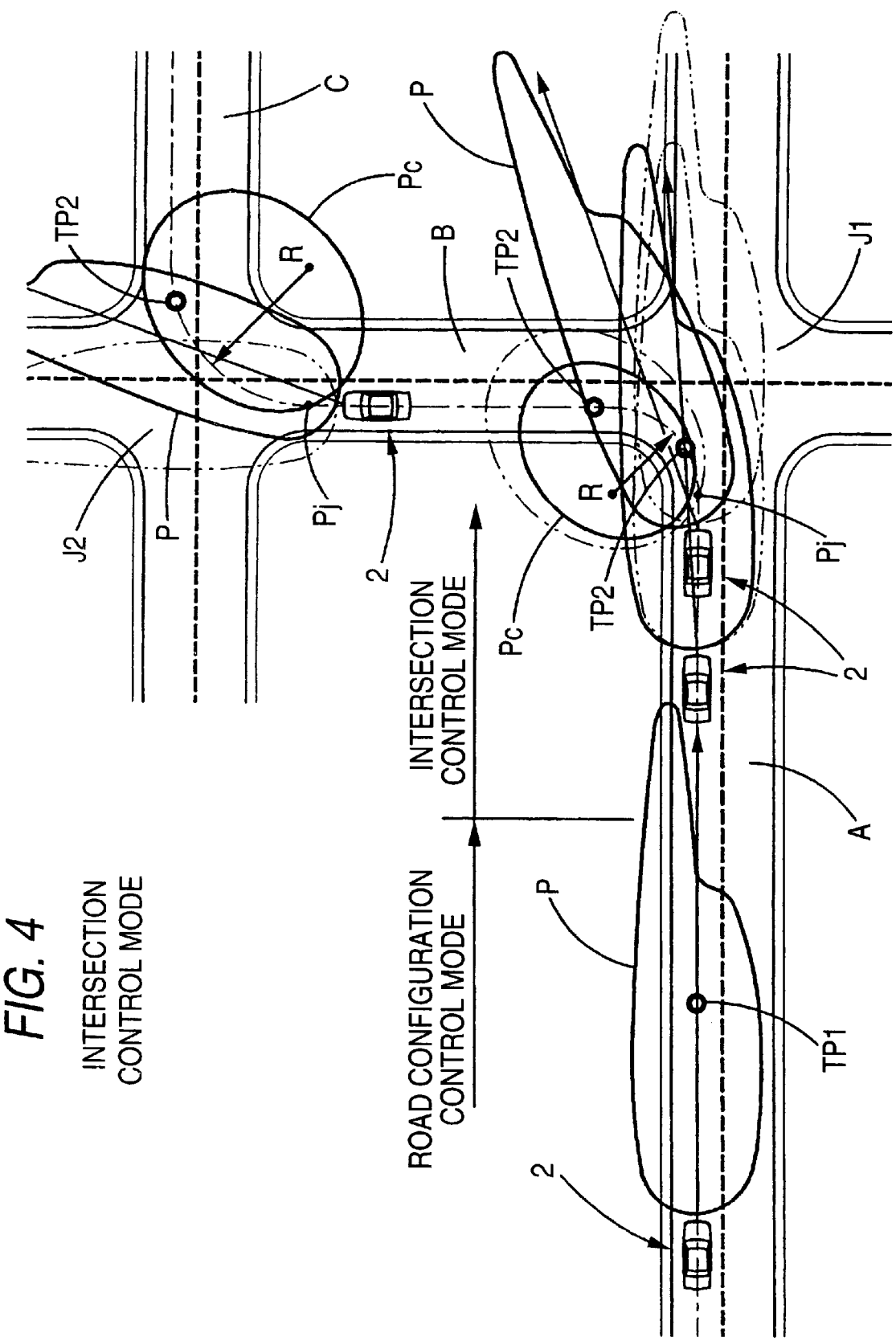
FIG. 4 is a plan view of roads for use in showing a specific intersection-control mode according to the first embodiment of the invention.

FIG. 4 is a plan view of a road for showing a specific example of the intersection-control mode.

In this specific example, it is assumed that the vehicle 2—running on the traveling road A at 30 km per hour—turns left at the next intersection J1, enters a traveling road B, and then turns right at the next intersection J2 thereby a traveling road C.

As shown in FIG. 4, while the vehicle 2 is in a position that is considerably separated on this side (left side) from the intersection J1 of the traveling road A, beam control is performed in the road-configuration control mode. However, the road-configuration control mode is switched to the intersection-control mode when the direction indicator is actuated as the vehicle 2 approaches to within a certain distance of the intersection J1.

In FIG. 4, a point TP2 shown ahead of the vehicle 2 designates a position to be reached by the vehicle 2.5 seconds later (i.e., a target position under the beam control) in the intersection-control mode. Initially, the luminous intensity distribution P is directed ahead of the vehicle 2, because the target position TP2 exists directly ahead of the vehicle 2, when the vehicle 2 is in the position on this side (left side) of, and is separated to a certain degree from, the intersection J1. As the target position TP2 becomes positioned on a turn-left travel line is (shown by a chain line in FIG. 4) within the intersection J1, as the vehicle 2 approaches the intersection J1, the luminous intensity distribution P is also deviated to the left from the head-on direction of the vehicle 2, as shown by a chain double-dashed line. That is, the target position TP2 is deviated to the left along the turn-left travel line within the intersection J1, whereby the luminous intensity distribution P is also changed to the left direction. When the direction of the target position TP2 exceeds the maximum tilting angle α of the reflector 28, however, the direction of the luminous intensity distribution P cannot follow the target position TP2. Therefore, the left-side cornering lamp 26 is lighted to form a luminous intensity distribution Pc, thereby irradiating an area in the leftward direction. Although the beam intensity of this cornering lamp 26 is initially low, the beam intensity is gradually increased as the difference between the maximum tilting angle α (of the reflector 28) and the angle directed to a target position T2 increases.

Beam control is also performed when the vehicle 2 is turned to the right at the next intersection J2. However, because the turning radius R of a turn-right travel line— within the intersection J2—is larger than a radius when turning left, the beam emission directed toward the target position T2 becomes insufficient if the beam intensity of the cornering lamp 26 is only gradually increased as the difference between the maximum tilting angle α of the reflector 28 and the angle directed to the target position T2 increases. Therefore, in this situation, the beam intensity is set at a maximum value immediately after the cornering lamp 26 is lighted.

When the vehicle 2 actually turns within the intersection, after having reached the intersection J1 or J2, the beam control is not performed in the intersection-control mode, but is performed in the corresponding-turning-angle mode.

The corresponding-turning-angle mode is a control mode to be utilized on the assumption that the vehicle 2 is actually turning; however, this mode is also used for complementing the road-configuration control mode and the intersection-control mode. In the corresponding-turning-angle mode, the reflectors 28 are turned in the turning direction of the vehicle 2 according to the steering angle, when the steering operation is performed. Simultaneously, the cornering lamp 26 that is positioned on the turning side of the vehicle 2, is lighted. At this time, the tilting angles of the reflectors 28, and the beam intensity of the cornering lamp 26, are gradually increased as the steering angle increases.

When the intersection-control mode is switched to the corresponding-turning-angle mode, beam emission control is taken over by the corresponding-turning-angle mode in order to prevent beam emission from being discontinuous, i.e., in order to prevent the luminous intensity distribution P of the headlamp 24 and the luminous intensity distribution Pc of the cornering lamp 26 from being abruptly varied.

FIGS. 5 and 6 are plan views of roads for showing specific examples of the corresponding-turning-angle mode.

In FIG. 5 it is assumed that the vehicle 2 is turned to the left at the intersection J1, and in FIG. 6 it is assumed that the vehicle 2 is turned to the right at the intersection J2.

As shown in these drawings, the conditions of beam emission in the intersection-control mode are followed until the steering angle is maximized. The steering angle is maximized through the steering operation in a positive direction when the vehicle 2 is turned at the intersections J1 and J2, whereby the tilting angle of the reflector 28, and the beam intensity of the cornering lamp 26, are maintained at the maximum value. That is, both the bilateral deflection angles of the luminous intensity distribution P, and also the size of the luminous intensity distribution Pc, are maximized. When the steering angle is decreased through a steering operation in a negative direction, the tilting angle of the reflector 28, and the beam intensity of the cornering lamp 26, are gradually decreased.

Figure 7:
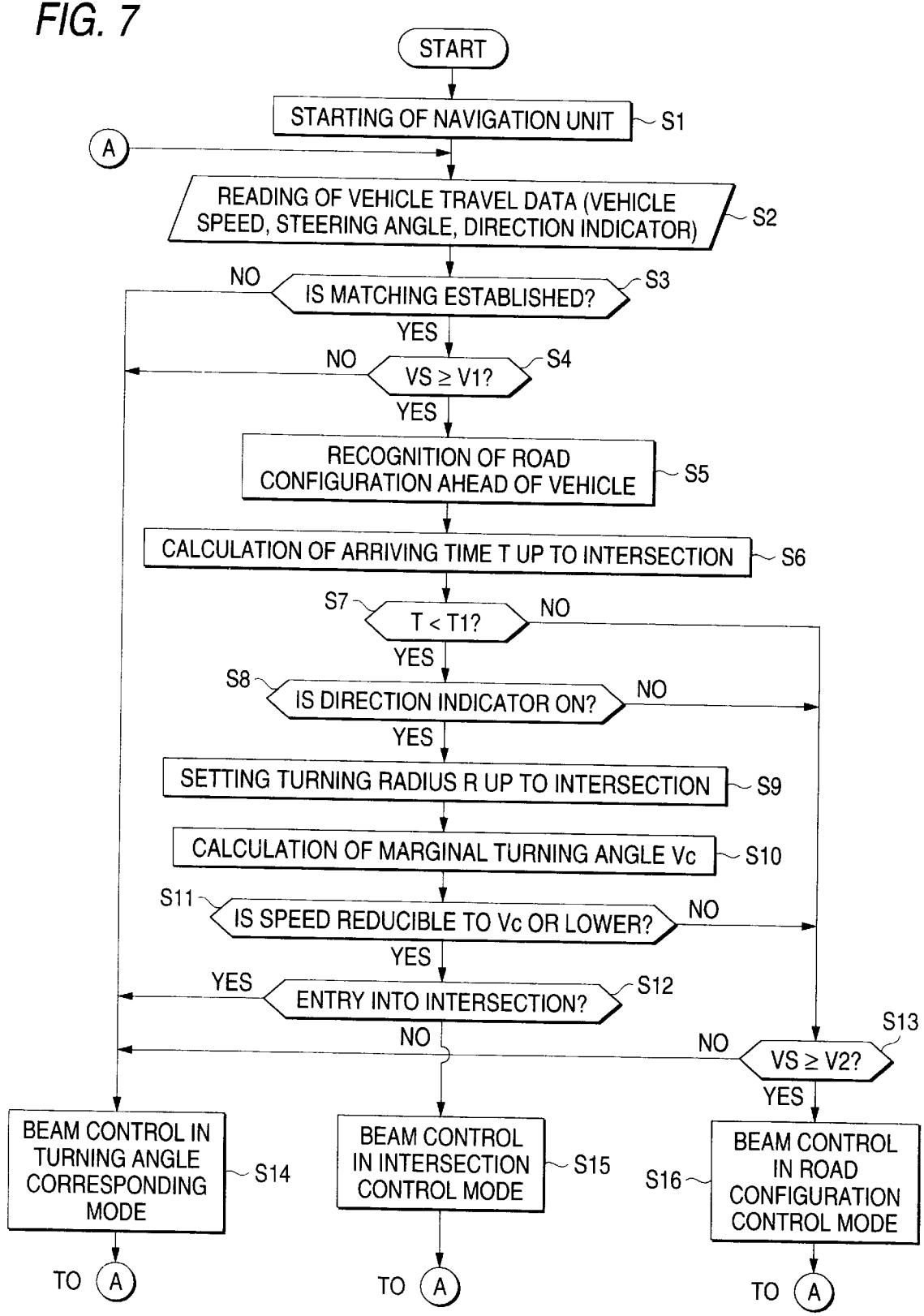
FIG. 7 is a flowchart showing the contents of beam control performed according to the first embodiment of the invention.

The contents of the beam control, performed in the vehicle headlamp system, according to this embodiment of the invention will now be described according to the flow-chart of FIG. 7.

First, the navigation unit 16 is started and road map data is read from the CD-ROM 62 so as to store road map data in the navigation ECU 60 (S1). Then, vehicle travel data— such as, for example, vehicle speed data from the vehicle speed sensor 50, steering data from the steering angle sensor 44, and data on the operating condition of the direction indicator from the direction indicator switch 42—are read (S2).

Further, map matching is conducted in the navigation ECU 60 on the basis of position data from the GPS receiver 64, direction data from the gyro sensor 66, and the road map data (S3).

When map matching is not established, i.e. the present position of the vehicle 2 is unrecognizable, then the beam control ECU 22 performs the beam control over the bilateral headlamps 20L and 20R in the corresponding-turning-angle mode on the assumption that the vehicle 2 is not on the road (S14).

When map matching is established, on the other hand, the beam control ECU 22 assumes that the vehicle 2 is present on the road, and compares the actual vehicle speed VS (vehicle speed at the present time) with a primary set vehicle speed V1 (predetermined speed; V1=20 km/hr, for example) (S4). If VS<V1, beam control is performed in the corresponding-turning-angle mode (S14). In this case, the beam control is not performed in the road-configuration-corresponding mode (i.e., either the road-configuration control mode, or the intersection-control mode) because lane or course changing is often made during travel at a low vehicle speed thereby making it difficult to estimate the course in the navigation unit 16. If VS<V1, on the other hand, the recognition of the road configuration ahead of the vehicle 2, needed for beam control, is sought in the road-configuration-corresponding mode (S5). In other words, a determination of the present position of the vehicle 2, the kind of the road on which the vehicle 2 is running, the number of lanes, positions of intersections (nodes) existing on the traveling road ahead, the number of intersecting roads (links) at the respective intersections, and the like, is carried out in the navigation unit 16.

The time T required for the vehicle 2 to reach the next intersection ahead on the traveling road, from its present position, is calculated (S6). The calculation is based on data on the road configuration ahead of the vehicle 2, and data on the actual vehicle speed VS. Then, a decision is made on whether or not the arriving time T is less than a set time T1. For example, T1 is set to an adequate value within the range of T1=2.5–3.5 seconds) (S7). The reason for setting T1 at 2.5 to 3.5 seconds in this case is that the operation of the direction indicator would be completed within that range of time so as to start the operation of reducing the speed when the course is changed at the intersection.

If the arriving time T is such that T≧T1, beam control is performed in the road-configuration control mode because it is reasonable to expect that the vehicle 2 will keep running on the road in accordance with the road configuration for the time being (S16). When the actual vehicle speed VS is less than a secondary set speed V2 (e.g., V2=40 km/hr) which is higher than the primary set vehicle speed V1, (i.e., NO at S13), then beam control is performed in the corresponding-turning-angle mode as the possibility of changing the line and the like is comparatively high (S14).

If the arriving time T is such that T<T1, on the other hand, a check is made to determine whether or not the direction indicator is in operation (S8). When the direction indicator switch 42 is held ON, the turning radius R is set at the intersection on the assumption that the course is changed at the next intersection (S8). When the direction indicator switch 42 is held OFF, the actual vehicle speed VS is checked, and if VS≧V2, beam control is performed in the road-configuration control mode (S16), whereas if VS<V2, beam control is performed in the corresponding-turning-angle mode (S14). The reason for using the road-configuration control mode, when VS≧V2, is that as long as the direction indicator remains unactuated with the vehicle speed maintained at a certain level or higher, it is unlikely that the vehicle will change course at the next intersection.

As shown in Table 1, the turning radius R is set by reading a value, that is set according to the kinds of traveling and intersecting roads, from a numerical value table for use in turning right (Table 1-1) and a numerical value table for use in turning left (Table 1-2).

TABLE 1-1

Turning Radius R(m)
when Turning Right at Rectangular Intersection:

|  |  | Intersecting Road | | |
|---|---|---|---|---|
|  |  | 4-lane Highway | 2-lane Highway | Prefectural Road, etc. |
| Traveling Road | 4-lane Highway | 16 | 11 | 7 |
|  | 2-lane Highway | 14 | 9 | 5 |
|  | Prefectural Road, etc. | 12 | 6 | 5 |

TABLE 1-2

Turning Radius R(m)
when Turning Left at Rectangular Intersection:

|  |  | Intersecting Road | | |
|---|---|---|---|---|
|  |  | 4-lane Highway | 2-lane Highway | Prefectural Road, etc. |
| Traveling Road | 4-lane Highway | 9 | 7 | 7 |
|  | 2-lane Highway | 7 | 5 | 5 |
|  | Prefectural Road, etc. | 5 | 5 | 5 |

As is obvious from Table 1, the turning radius R at the time of turning right is often set at a value greater than the value set at the time of turning left, in the keep-to-the-left traffic environment. When the intersection is not a rectangular one, the value read from the numerical value table is subjected to correction so as to set the turning radius R. More specifically, the turning radius R is increased when the direction of travel at the intersection makes an obtuse angle with the traveling road. Similarly, the turning radius R is decreased when the direction of travel at the intersection makes an acute angle with the traveling road.

Thus, the turning radius R is set before calculating the marginal turning speed Vc at which the vehicle 2 is actually capable of traveling in a curve with the turning radius R (S10). The calculation of the marginal turning speed Vc is carried out by using the following road linear design theory adopted in the field of traffic engineering:

$$R = \frac{V^2}{127(i+f)}$$

where i=one-sided gradient; and f=side slip coefficient in the road linear design theory. If i=0 and f=0.25, the relation between the turning radius R and the marginal turning speed Vc is as shown in Table 2.

TABLE 2

Calculated values (km/hr)
of Marginal Turning Speed Vc in Traffic Engineering

| Turning Radius R | 5 | 6 | 7 | 8 |
|---|---|---|---|---|
| Marginal Turning Speed | 12.59 | 13.80 | 14.91 | 15.93 |
| Turning Radius R | 9 | 10 | 12.5 | 15 |
| Marginal Turning Speed | 16.90 | 17.81 | 19.92 | 21.82 |

Further, a check is made to determine whether or not the actual vehicle speed VS is reducible to the marginal turning speed Vc before the vehicle 2 reaches the intersection (S11). A discriminant using: the distance between the vehicle 2 and the intersection; the reduction degree calculated from the actual vehicle speed VS; and the frictional coefficient of the road surface, is employed for carrying out the check. Usually when the distance up to the intersection is decided, a reference position on the intersection side is preferably set at the entry point. The entry point is the position shown by Pj in FIGS. 4 to 6, whereas the reference position is a position whereat the steering operation is started. However, the reference position would not deviate so much from the entry point Pj even if the reference position is set at a position resulting from deducting a distance equivalent to the turning radius R from the center of the intersection.

When the actual vehicle speed VS is not reducible to the marginal turning speed Vc or lower (i.e., NO at S11), the beam control ECU 22 assumes that the direction indicator is mistakenly actuated, or that simply the lane is about to be changed, and performs beam control in the road-configuration control mode (S14), thereby preventing beam emission from being turned in the direction in which the direction indicator is actuated.

On the other hand, when the actual vehicle speed VS is reducible to the marginal turning speed Vc or lower (i.e., YES at S11), a decision is made on whether or not the vehicle has entered the intersection (S12). This decision is made on whether or not the arriving time T up to the intersection has become such that T≦0. When the vehicle has not entered the intersection yet, beam control is performed in the intersection control mode (S15), and where the vehicle has entered the intersection, beam control is performed in the corresponding-turning-angle mode (S14).

As described above in detail, the beam control ECU 22—for controlling the beams emitted from the respective bilateral headlamps 20L and 20R in the vehicle headlamp system according to this embodiment of the invention—is provided with the road-configuration control mode and the corresponding-turning-angle mode. In the road-configuration control mode, beam control is performed according to the detected results of the road configuration ahead of the vehicle 2. In the corresponding-turning-angle mode, beam control is performed according to the detected results of the turning angle of the vehicle 2. Since one of the above modes is selected in response to the vehicle speed, the beam emitting direction is prevented from being inadvertently changed—irrespective of the rise and fall of vehicle speed—through the actuation of the direction indicator or the steering operation as before.

Therefore, according to this embodiment of the invention, the vehicle headlamp system so configured as to perform beam control over the headlamps provides the road surface ahead of the vehicle 2 with sufficient irradiation without giving the driver a feeling of wrongness.

The following operation/working effect is achievable. According to this embodiment of the invention, the specific method of selecting between the aforementioned modes is in response to the vehicle speed. The method comprises the steps of performing beam control in the road-configuration corresponding mode when the actual vehicle speed is at the primary set vehicle speed V1 or higher, and performing beam control in the corresponding-turning-angle mode when the actual vehicle speed is lower than the primary set vehicle speed V1.

More specifically, to sufficiently irradiate the road surface ahead of the vehicle 2, it is basically preferred to perform beam control according to the detected results of the road configuration ahead of the vehicle 2. However, the lane and course are often changed during traveling at a low vehicle speed in a manner having no connection with the road configuration ahead of the vehicle 2. Therefore, beam emission in conformity with the actual travel situation of the vehicle 2 can be realized by performing beam control according to the detected results of the turning angle of the vehicle 2 during traveling at a low vehicle speed.

According to this embodiment of the invention, the road-configuration-corresponding mode is constituted of the road-configuration control mode and the intersection-control mode. The road-configuration control mode is for carrying out beam emission fit for traveling in accordance with the road configuration, whereas the intersection-control mode is for carrying out beam emission fit for traveling in a curve at an intersection. Therefore, smoother beam emission can be carried out and, consequently, the road surface ahead of the vehicle 2 is irradiated still more sufficiently.

According to this embodiment of the invention, when the arriving time T to the next intersection is the set time T1 or higher, and when the vehicle speed is the secondary set vehicle speed V2 or higher (wherein V2>V1), beam control is performed in the road-configuration control mode on the assumption that the vehicle 2 will proceed on the traveling road in according with the road configuration for the time being. Thusly, the driver is effectively prevented from being given a feeling of wrongness.

When the arriving time T to the intersection is less than the set time T1, and when the direction indicator is in operation, beam control is performed in the intersection-control mode so that beam emission is carried out in bilateral turning directions in good time. Consequently, beam emission in conformity with the road configuration ahead of the vehicle 2 can be carried out, in contrast to the case where beam control is performed in the corresponding-turning-angle mode. When the vehicle speed is not reducible to the marginal turning speed Vc by the time the vehicle 2 reaches that intersection, beam control is performed in the road-configuration control mode, whereby beam control is prevented from being performed in the intersection-control mode even when the direction indicator is mistakenly actuated or is actuated only to change lanes.

On the other hand, even though the arriving time T to the next intersection is less than the set time T1, beam control is performed in the road-configuration control mode when the vehicle speed is at the secondary set vehicle speed V2 or higher, and when the direction indicator is unactuated. Thusly, the driver is prevented from being given a feeling of wrongness by uselessly switching the beam control to the intersection-control mode when it is expected that the vehicle 2 will be running in accordance with the road configuration.

According to this embodiment of the invention, beam control is performed in the corresponding-turning-angle mode when the steering operation is actually conducted, as when the vehicle travels in a curve at an intersection. Thusly, beam emission is in conformity with the actual travel condition of the vehicle 2.

A second embodiment of the invention will now be described with reference to FIGS. 8 and 9.

Figure 8:
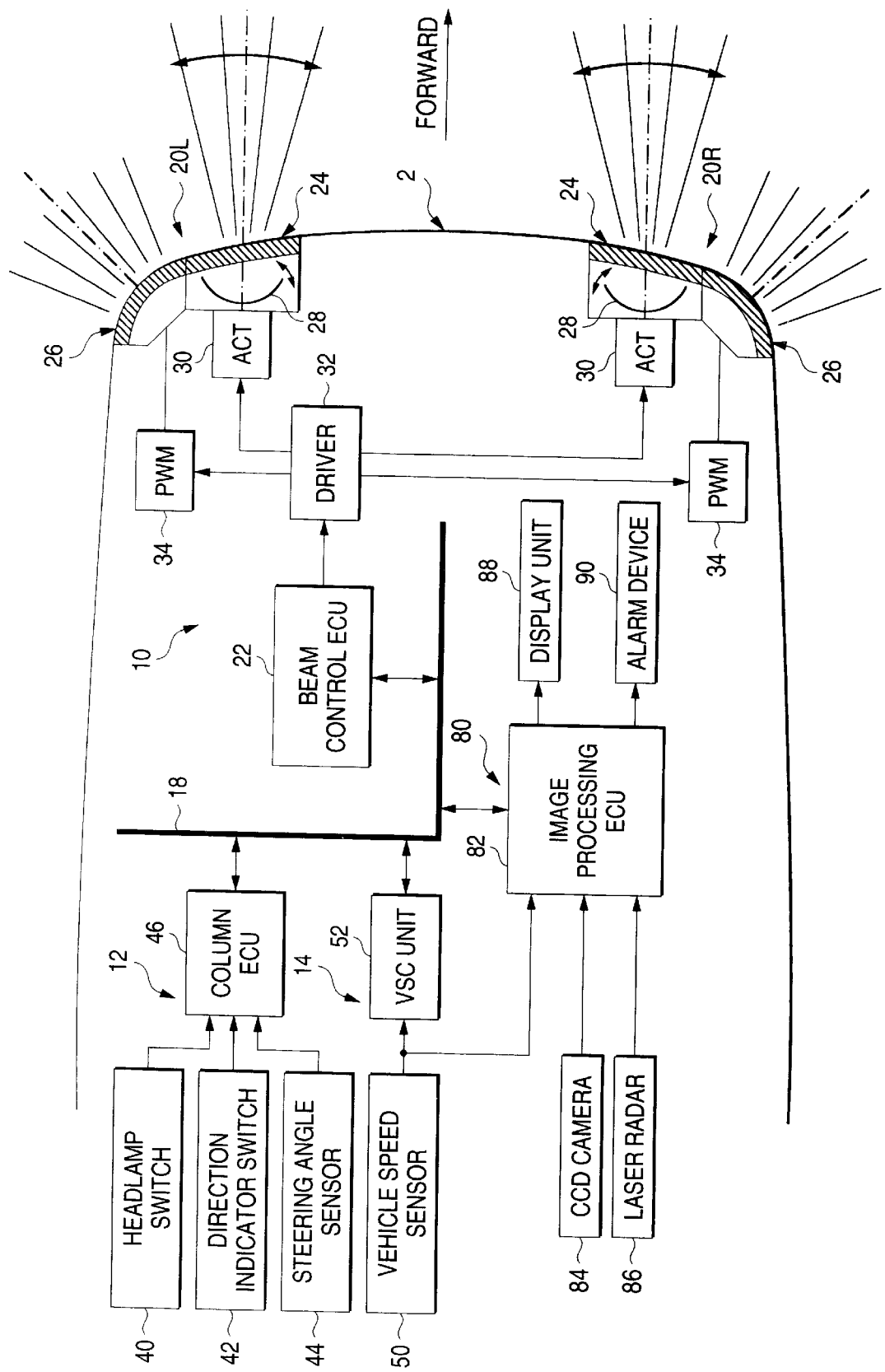
FIG. 8 is an overall block diagram showing a vehicle headlamp system according to a second embodiment of the invention.
Figure 9:
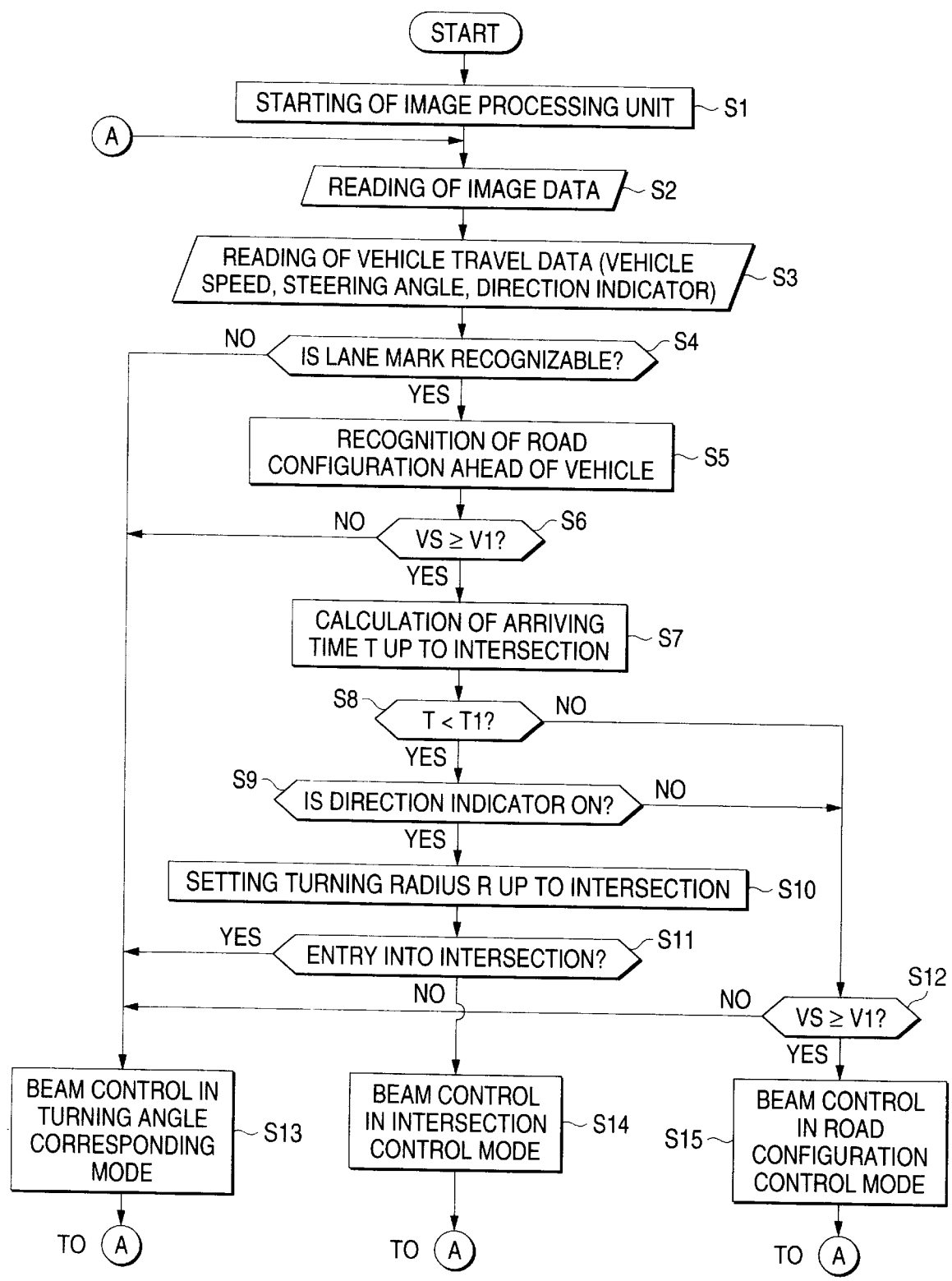
FIG. 9 is a flowchart showing the contents of beam control performed according to the second embodiment of the invention.

FIG. 8 is an overall block diagram showing a vehicle headlamp system according to this embodiment of the invention.

As shown in FIG. 8, the vehicle headlamp system comprises the headlamp unit 10, the column unit 12, and the VSC unit 14, in a manner substantially similar to the first embodiment of the invention. But this headlamp system is different from that of the first embodiment in that an image processing unit 80 is used in place of the navigation unit 16, and is connected to the interior LAN 18.

The image processing unit 80 includes an image processing ECU 82, a CCD camera 84, a laser radar 86, a display unit 88, and an alarm device 90.

In this embodiment of the invention, the beam control ECU 22, of the headlamp unit 10, collects necessary data from the column unit 12, the VSC unit 14, and the image processing unit 80, via the interior LAN 18. Further, the beam control ECU 22 performs beam control over the bilateral headlamps 20L and 20R in a control mode fit for the travel conditions of the vehicle.

As in the first embodiment of the invention, the control mode includes the road-configuration-corresponding mode and the corresponding-turning-angle mode. The road-configuration-corresponding mode includes the road-configuration control mode and the intersection-control mode. Incidentally, though the contents of beam control in the corresponding-turning-angle mode are similar to those in the first embodiment of the invention, the contents of beam control in the road-configuration control mode and the intersection-control mode are partially different from those in the first embodiment due to the use of the image processing unit 80 in place of the navigation unit 16.

The contents of the beam control performed in the vehicle headlamp system according to this embodiment of the invention will now be described according to a flowchart of FIG. 9.

First, the image processing unit 80 is started (S1), and image data concerning a road surface ahead of the vehicle is picked up by the CCD camera 84 and is read in the image processing ECU 82 (S2). Then vehicle travel data (vehicle speed data from the vehicle speed sensor 50, steering data from the steering angle sensor 44, and data on the operating condition of the direction indicator from the direction indicator switch 42) are read (S3).

Then, a decision is made on whether or not lane marks (white lines extending along a road) are recognizable (S4). This decision is made to determine whether lane marks are unrecognizable because of bad weather and the like, or whether lane marks exist on the road, and so on. When such lane marks are unrecognizable, beam control is performed in the corresponding-turning-angle mode (S13) On the other hand, when the lane marks are recognizable, the road configuration ahead of the vehicle—necessary for beam control in the road configuration corresponding mode (S5)—can be recognized.

The beam control ECU 22 compares the actual vehicle speed VS with the primary set vehicle speed V1 (e.g., V1=20 km/hr) (S6). If VS<V1, beam control is performed in the corresponding-turning-angle mode (S13). Otherwise, if VS≧V1, an arriving time T necessary for the vehicle 2 to reach the next intersection positioned ahead on the traveling road from its present position is calculated (S7). The calculation is based on image data as to the road configuration ahead of the vehicle 2, and on the actual vehicle speed data VS. Recognition of the intersection is made by extracting a characteristic of whether or not a signal exists in the forward image through predetermined image processing. White lines on the pedestrian crossing are simultaneously detected to calculate a distance up to the white lines from the vehicle 2 whereby the calculated result is set as the distance up to the intersection.

Then, a decision is made as to whether or not the arriving time T is less than a set time T1 (e.g., an adequate value within the range of T1=2.5–3.5 seconds) (S8). If the arriving time T is such that T≧T1, beam control is performed in the road-configuration control mode because it is expected that the vehicle 2 will keep running on the road in accordance with the road configuration for the time being (S15). When the actual vehicle speed VS is less than a secondary set speed V2 (e.g., V2=40 km/hr), which is higher than the primary set vehicle speed V1, (i.e., NO at S12), then beam control is performed in the corresponding-turning-angle mode because the possibility of changing lanes and the like is comparatively high (S13) In the road-configuration control mode, the presence of a curved road is confirmed from the results of image analysis to compute the position of a clipping point of the curved road, and beam control is performed with the clipping point as a target position. The clipping point is set, for example, in a position ahead of the inflection point of the lane mark on the road-shoulder side as viewed from the driver.

On the other hand, if the arriving time T is such that T<T1, a check is made to determine whether or not the direction indicator is in operation (S9). When the direction indicator switch 42 is held ON, the turning radius R is set at the intersection on the assumption that the course will be changed at the next intersection (S10). The turning radius R is set by processing image data concerning the lane marks on the forward road surface.

When the direction indicator switch 42 is held OFF, on the other hand, the actual vehicle speed VS is checked. If VS≧V2, beam control is performed in the road-configuration control mode (S15), whereas if VS<V2, beam control is performed in the corresponding-turning-angle mode (S13). The reason for using the road-configuration control mode when VS≧V2, is that if the direction indicator remains unactuated with the vehicle speed maintained at a certain level or higher, the course of the vehicle is not likely to be changed at the next intersection.

Further, a decision is made to determine whether or not the vehicle 2 has entered the intersection (S11). Such a decision is made on the basis of the fact that the pedestrian crossing disappears from the image data regarding the road surface ahead of the vehicle 2; when the vehicle 2 has not yet entered the intersection, beam control is performed in the road-configuration control mode (S14). On the other hand, when the vehicle 2 has entered the intersection, beam control is performed in the corresponding-turning-angle mode (S13).

According to this embodiment of the invention, the beam control ECU 22 of the headlamp unit 10 performs beam control over the bilateral headlamps 20L and 20R on the basis of the image data picked up by the CCD camera 84 about the road surface ahead of the vehicle 2. Therefore, it is infeasible to provide beam control that is more accurate than the beam control performed by the navigation data and the like according the first embodiment thereof. However, this embodiment of the invention has the working effect of having the road surface ahead of the vehicle 2 sufficiently irradiated using a vehicle headlamp system simple in construction without giving a driver a feeling of wrongness.

In each of the above embodiments of the invention, the arriving time T to the next intersection has been used as one of the criteria in selecting a beam control mode. However, the arriving distance can be used in place of the arriving time T to the next intersection.

A description has been given of a case where the luminous intensity distribution P—formed by beam emission from the headlamp of each of the bilateral headlamps 20L and 20R in each of the above embodiments of the invention—is formed by a low-beam. However, the same working effect as what is described in each of the above-described embodiments is achievable by performing the same beam control—as that in each of the above embodiments—when using beam emission with a high-beam luminous intensity distribution by switching beams.

Further, a description has been given of a case where each of the bilateral headlamps 20L and 20R is constituted of the headlamp 24 (whose reflector 28 is bilaterally tiltable) and the cornering lamp 26 (capable of dimming). However, any other lamp arrangement can also be used. For example, there can be used headlamps 24 capable of varying the beam emission range, cornering lamps 26 capable of varying the beam emitting direction, and so on, or any other lamp in addition to the headlamps 24 and the cornering lamps 26. And the same working effect as that in the above-described embodiments can also be achievable by properly controlling beams of the respective lamps.

The present invention is not limited to the specific above-described embodiments. It is contemplated that numerous modifications may be made to the vehicle headlamp system of the present invention without departing from the spirit and scope of the invention as defined in the following claims.

What is claimed is:

1. A vehicle headlamp system comprising:

headlamps for forwardly emitting beams from a vehicle;

beam control means for controlling the beams emitted from said headlamps;

road configuration detection means for detecting a road configuration ahead of the vehicle; and turning-angle detection means for detecting the turning angle of the vehicle, wherein said beam control means is provided with a road-configuration-corresponding mode in which beam control is performed according to the results detected by said road configuration detection means, and a corresponding-turning-angle mode in which beam control is performed according to the results detected by said turning-angle detection means, and further wherein one of said road-configuration-corresponding mode and said corresponding-turning-angle mode is selected in response to the vehicle speed.

2. A vehicle headlamp system as claimed in claim 1, wherein said beam control means performs beam control in said road-configuration-corresponding mode when the vehicle speed is at a predetermined vehicle speed or higher, whereas said beam control means performs beam control in said corresponding-turning-angle mode when the vehicle speed is lower than said predetermined vehicle speed.

3. A vehicle headlamp system as claimed in claim 2, wherein said road-configuration-corresponding mode includes a road-configuration control mode and an intersection-control mode, wherein in said road-configuration control mode, beam emission fit for traveling in accordance with the road configuration is caused to be carried out, and further wherein in said intersection-control mode, beam emission fit for traveling in a curve at intersections is caused to be carried out.

4. A vehicle headlamp system as claimed in claim 3, wherein said beam control means performs beam control in said road-configuration control mode when an arriving time or distance to a next intersection is at a predetermined value or greater, and when the vehicle speed is higher than the predetermined vehicle speed as well as equal to a secondary predetermined vehicle speed or higher.

5. A vehicle headlamp system as claimed in claim 3, wherein said beam control means performs beam control in said intersection-control mode when the arriving time or distance to the next intersection is less than the predetermined value, and while a direction indicator is in operation.

6. A vehicle headlamp system as claimed in claim 5, wherein said beam control means performs beam control in said road-configuration control mode when said beam control means detects that it is not possible to reduce the vehicle speed to a marginal turning speed before the vehicle arrives at the next intersection.

7. A vehicle headlamp system as claimed in claim 3, wherein said beam control means performs beam control in the road-configuration control mode when the arriving time or distance to the next intersection is less than the predetermined value, and while the direction indicator is not in operation, as long as the vehicle speed is at said secondary predetermined vehicle speed or higher.

8. A vehicle headlamp system as claimed in claim 1, wherein said beam control means performs beam control in said corresponding-turning-angle mode while the vehicle travels in a curve at the intersection.

9. A vehicle headlamp system comprising:

headlamps for forwardly emitting beams from a vehicle;

a beam control ECU that is programmed to control the beams emitted from said headlamps;

a navigation ECU that gathers information about a road configuration ahead of the vehicle;

a steering angle sensor that determines the turning angle of the vehicle; and a vehicle-speed sensor, wherein said beam control ECU is programmed with a road-configuration-corresponding mode in which beam control is performed according to the road configuration as determined by said navigation ECU, and a corresponding-turning-angle mode in which beam control is performed according to a signal from said steering angle sensor, and further wherein said beam control ECU determines whether to use said road-configuration-corresponding mode or said corresponding-turning-angle mode based on an evaluation of a signal from said vehicle-speed sensor.

10. A vehicle headlamp system as claimed in claim 9, further comprising:

a GPS system;

a gyro-sensor; and a CD-ROM, wherein said GPS system, said gyro-sensor, and said CD-ROM, are connected to said navigation ECU so as to provide said navigation ECU with information about the road configuration ahead of the vehicle.

11. A vehicle headlamp system as claimed in claim 9, further comprising:

a CCD camera; and a laser radar system, wherein said CCD camera, said laser radar system, and said vehicle-speed sensor, are connected to said navigation control ECU to provide said navigation control ECU with information about the configuration of the road ahead of the vehicle, and further wherein said navigation control ECU is an image processing ECU.

* * * * *